United States Patent
Lin (10) Patent No.: US 7,813,062 B2
(45) Date of Patent: Oct. 12, 2010

(54) APPARATUS FOR ASSEMBLING LENS GROUP

(75) Inventor: Tsung-Yu Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 55 days.

(21) Appl. No.: 12/261,318

(22) Filed: Oct. 30, 2008

(65) Prior Publication Data

US 2009/0316283 A1    Dec. 24, 2009

(30) Foreign Application Priority Data

Jun. 18, 2008    (CN)    ......... 2008 1 0302188

(51) Int. Cl.
  *G02B 7/02*    (2006.01)
(52) U.S. Cl. ............ 359/811; 359/819
(58) Field of Classification Search ......... 359/811, 359/812, 813, 816, 817, 819–822
See application file for complete search history.

(56) References Cited

U.S. PATENT DOCUMENTS

| | | | | |
|---|---|---|---|---|
| 5,825,561 | A * | 10/1998 | Ohguri | 359/822 |
| 6,480,346 | B2 * | 11/2002 | Funakoshi | 359/808 |
| 7,170,693 | B2 * | 1/2007 | Maeda et al. | 359/811 |

* cited by examiner

*Primary Examiner*—Timothy J Thompson
(74) *Attorney, Agent, or Firm*—Andrew C. Cheng (57) ABSTRACT

An exemplary apparatus for assembling a lens group comprise a lens tray, a plurality of cylindrical holes and a plurality of guiding grooves. The lens tray has a first surface and an inner side surface in each hole. The cylindrical holes are defined in the first surface for receiving a plurality of optical elements therein. The guiding grooves are defined in each inner side surface and exposed at the first surface, each groove communicats with the corresponding hole for allowing air to flow therethrough.

14 Claims, 7 Drawing Sheets

APPARATUS FOR ASSEMBLING LENS GROUP

BACKGROUND

1. Technical Field

The present disclosure relates to apparatus for assembling a lens group.

2. Description of Related Art

Camera modules are included as a feature in a wide variety of devices, such as digital cameras and mobile phones. Generally, a camera module includes a lens module comprising a lens barrel and at least one lens group mounted in the lens barrel. Typically, a lens group includes various optical elements (e.g. lenses, spacers, and filters) received in the lens barrel.

Figure 6:
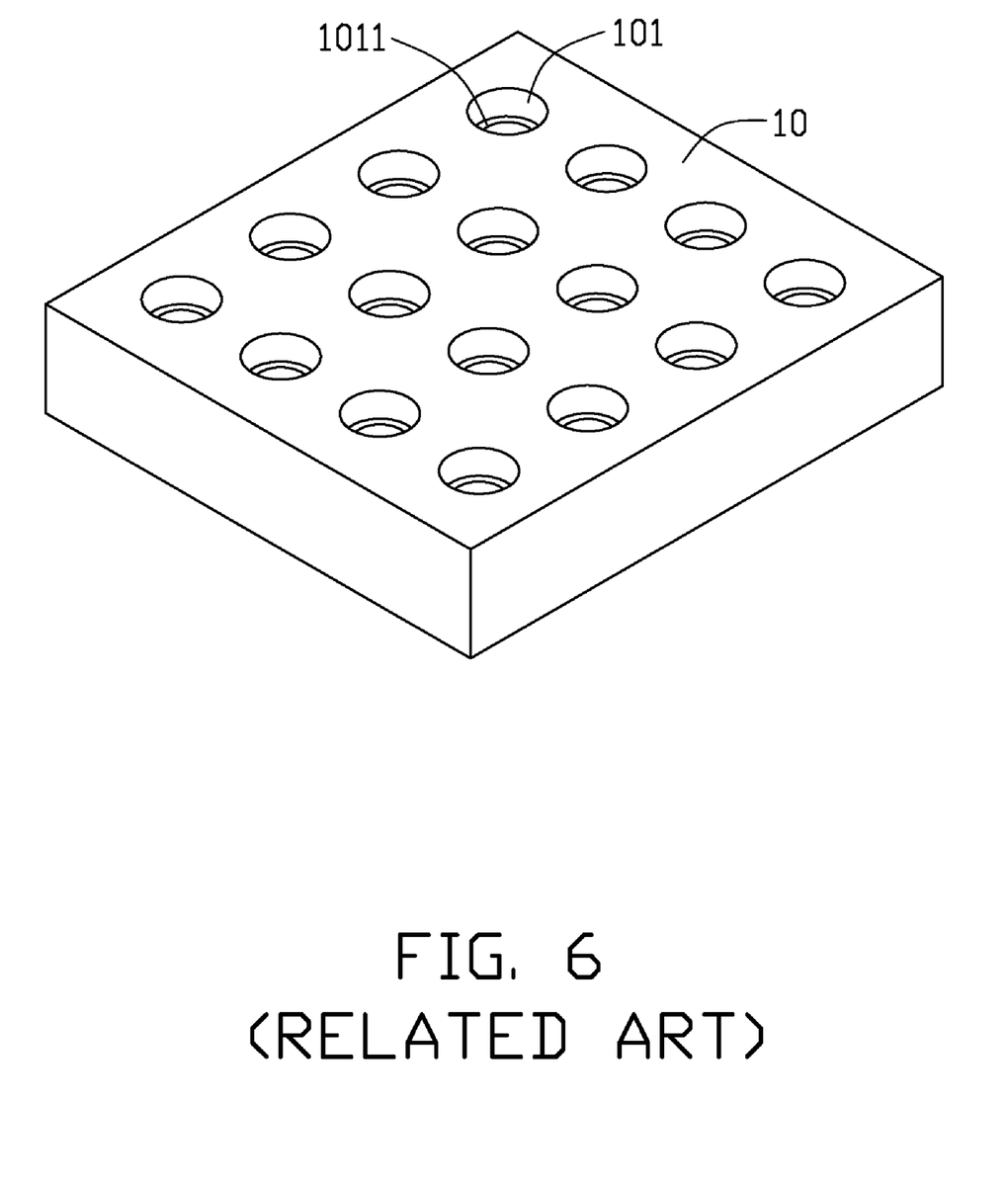
FIG. 6 is a schematic, isometric view of a conventional supporting tray for assembling a lens group.

A lens group is arranged and assembled in a lens barrel by use of an assembling apparatus (e.g. supporting table) as needed. A previous supporting tray (see FIG. 6) for assembling a lens group, includes a base plate 10, a plurality of holes 101 defined in the base plate 10. The base plate 10 has a carrying protrusion 1011 in the holes 101 extending outwardly from the base plate 10, and is configured for carrying the optical elements.

Figure 7:
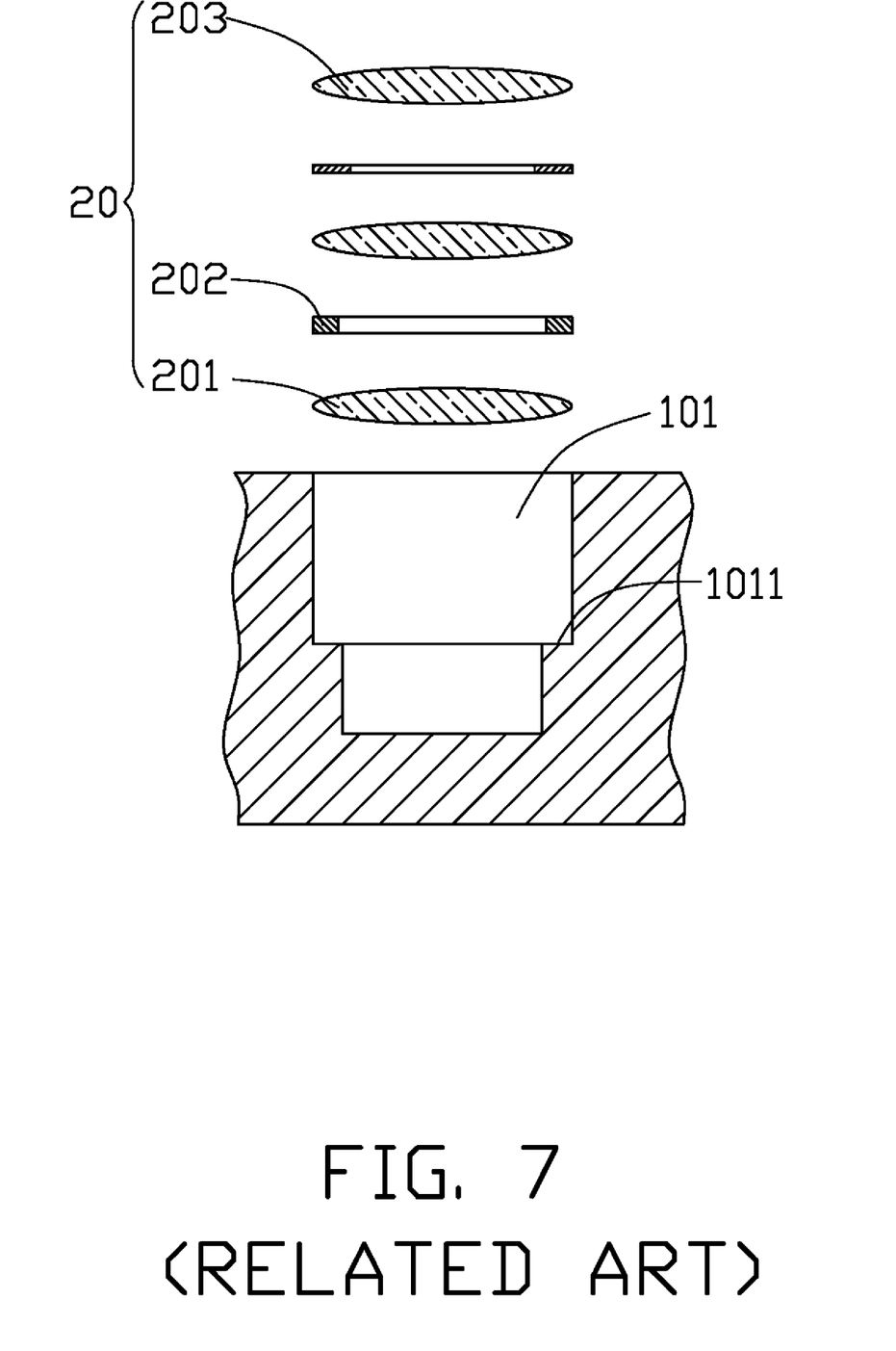
FIG. 7 is a cross-sectional view of a portion of FIG. 6, together with optical members.

During assembly of a lens module, referring to FIG. 7, firstly, a first lens 201 is placed on the carrying protrusion 1011. Secondly, a number of spacers 202 and a number of second lenses 203 are assembled into the corresponding hole 101 one by one in a manner that optical axes of the first and second lenses 201, 203 lie in a same line. The first lens 201, the second lenses 203, and the spacers are bonded together with adhesive thereby forming a lens group 20. The lens group 20 is configured to be assembled into the lens barrel (not shown) to obtain a lens module.

To ensure proper alignment of the optical axes of the first and second lenses 201, 203, a diameter of each hole 101 must be equal to that of the respective optical elements assembled therein. That is, outer side surfaces of the optical elements are in airtight contact with an inner surface of the hole. Thus, when a lens is assembled into the hole, the air in the hole remains in the hole and is pressed by the lens, which may cause misalignment of the optical axes.

Therefore, what is desired is an apparatus for assembling a lens group that is capable of overcoming the aforementioned problems.

SUMMARY

An exemplary apparatus for assembling a lens group comprise a lens tray, a plurality of cylindrical holes and a plurality of guiding grooves. The lens tray has a first surface and an inner side surface in each hole. The cylindrical holes are defined in the first surface for receiving a plurality of optical elements therein. The guiding grooves are defined in each inner side surface and exposed at the first surface, each groove communicats with the corresponding hole for allowing air to flow therethrough.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Reference will now be made to the drawings to describe exemplary embodiments of the present apparatus for assembling a lens group in detail.

Figure 1:
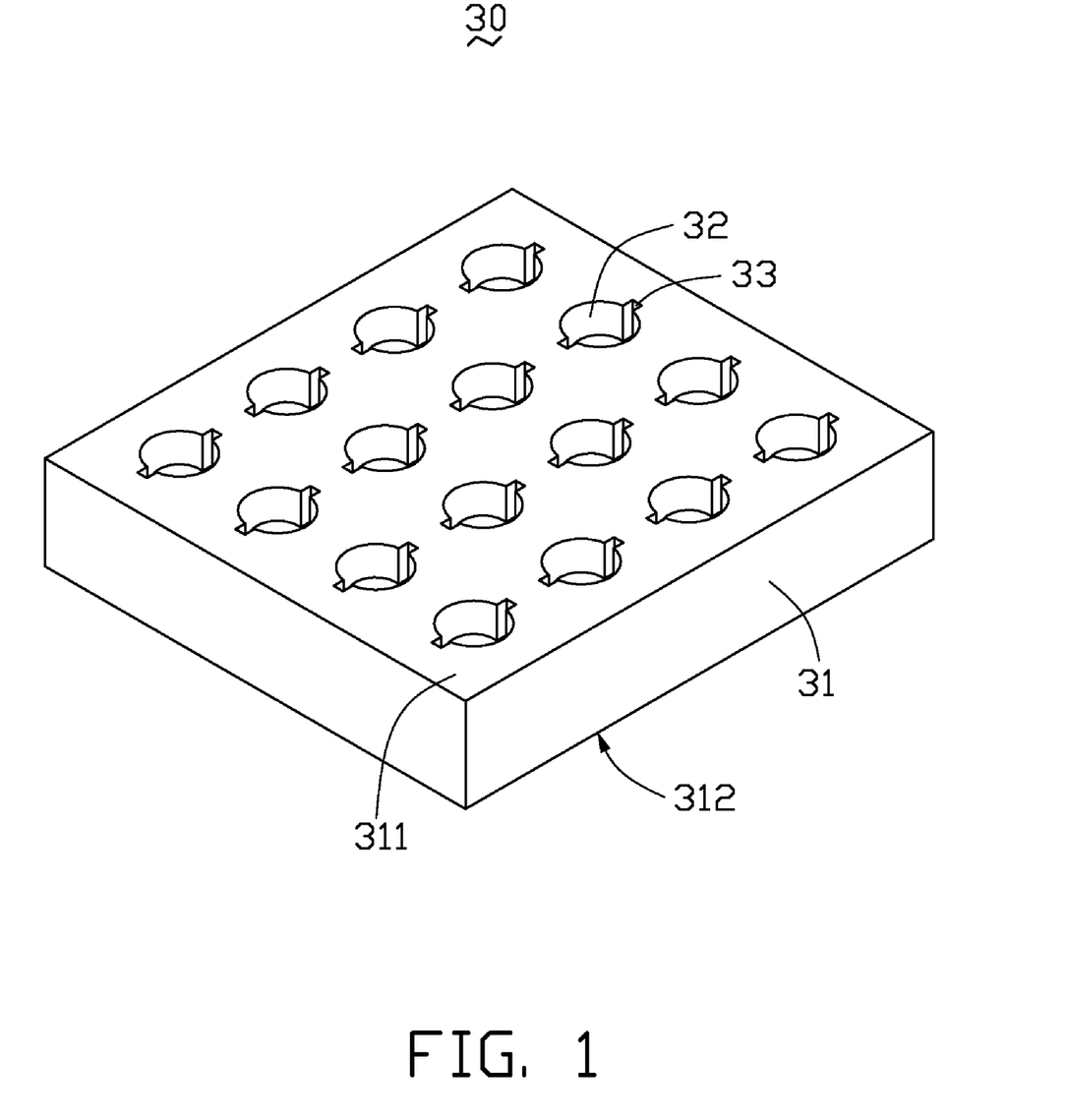
FIG. 1 is a schematic, isometric view of an apparatus for assembling a lens group in accordance with a first embodiment.
Figure 2:
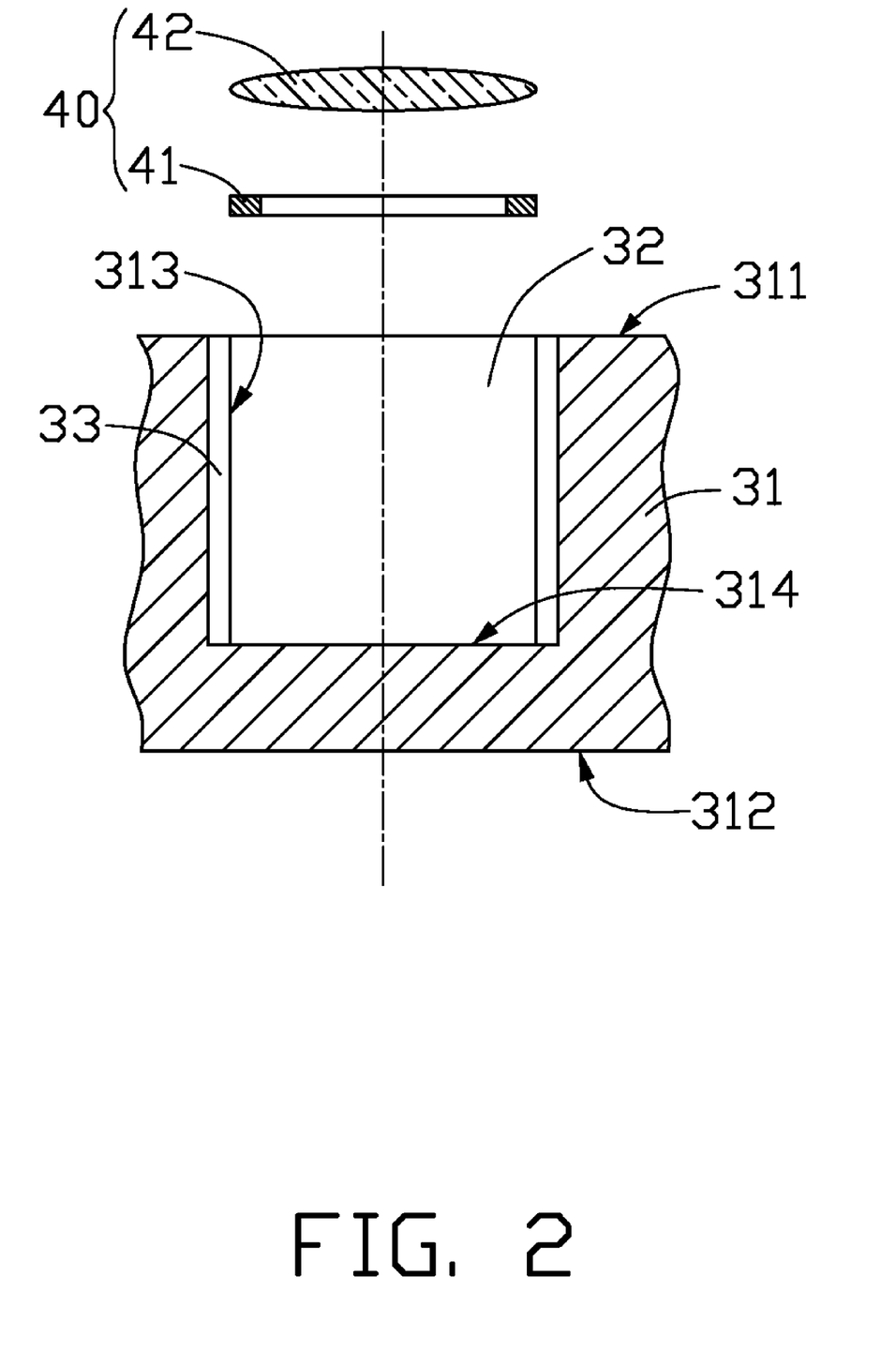
FIG. 2 is a cross-sectional view of a portion of the apparatus of FIG. 1, together with a lens group.

Referring to FIG. 1 and FIG. 2, an apparatus 30 for assembling a lens group, according to a first embodiment, includes a lens tray 31, a number of cylindrical holes 32, and a number of guiding grooves 33. The cylindrical holes 32 and the guiding grooves 33 are defined in the lens tray 31.

The lens tray 31 is substantially rectangular and has a first surface 311 and a second surface 312 opposite to the first surface 311. The lens tray 31 has an inner side surface 313 and an inner bottom surface 314 perpendicularly adjoining the respective inner side surface 313 in each of the cylindrical holes 32.

The cylindrical holes 32 defined in the first surface 311 are capable of receiving a number of optical elements (e.g. lenses, spacers, and filters) therein. Each cylindrical hole 32 surrounded the guiding grooves 33, extends inwardly from the first surface 311 toward the second surface 312 but does not reach the second surface 312. Arrangement of the cylindrical holes 32 and shape and size of each cylindrical hole 32 can be varied in response to practical requirements. In this embodiment, the cylindrical holes 32 are of the same size, and arranged as a two-dimensional matrix.

The guiding grooves 33 are defined in each inner side surface 313, exposed at the first surface 311. Each of the guiding grooves 33 extends inwardly from the inner side surface 313 to the lens tray 31 and communicates with the corresponding cylindrical hole 32 to allow air to flow therethrough. During a process of assembling a lens group, the guiding grooves 33 can provide a passage for allowing air to flow therethrough and allow access with a tool such as a tweezers configured for grasping optical elements. Each guiding groove 33 extends inwardly from the first surface 311 to the second surface 312 but does not reach to the second surface 312.

In the present embodiment, two guiding grooves 33 are symmetrically arranged along a central axis of the respective cylindrical hole 32. An extending direction of each guiding groove 33 is parallel with that of each cylindrical hole 32. The depth of each hole 32 is equal to the height of the corresponding guiding groove 33. In the apparatus 30, air remaining between the optical elements can efficiently escape via the guiding grooves 33. It is to be understood that, in alternative embodiments, the guiding grooves 33 may be distributed in desired pattern, symmetrical or otherwise, and the depth of each hole 32 can be more or less than the length of the corresponding guiding groove 33.

An operation process for assembling a lens groups 40 is as follows. Referring to FIG. 2, firstly, a spacer 41 is accommodated in each respective hole 32 and attached to the inner bottom surface 314, such that a central axis of the spacer 41 is coincident with the central axis of the respective hole 32. Secondly, a lens 42 is assembled in the respective hole 32 and adhered to the spacer 41 so that the optical axis of the lens 42 is coincident with the central axis of the hole 32. Finally, a tool may be used to remove the spacer 41 and the lens 42 from the hole 32. The lens group 40 is then ready to be assembled in a barrel (not shown) to obtain a lens module.

Figure 3:
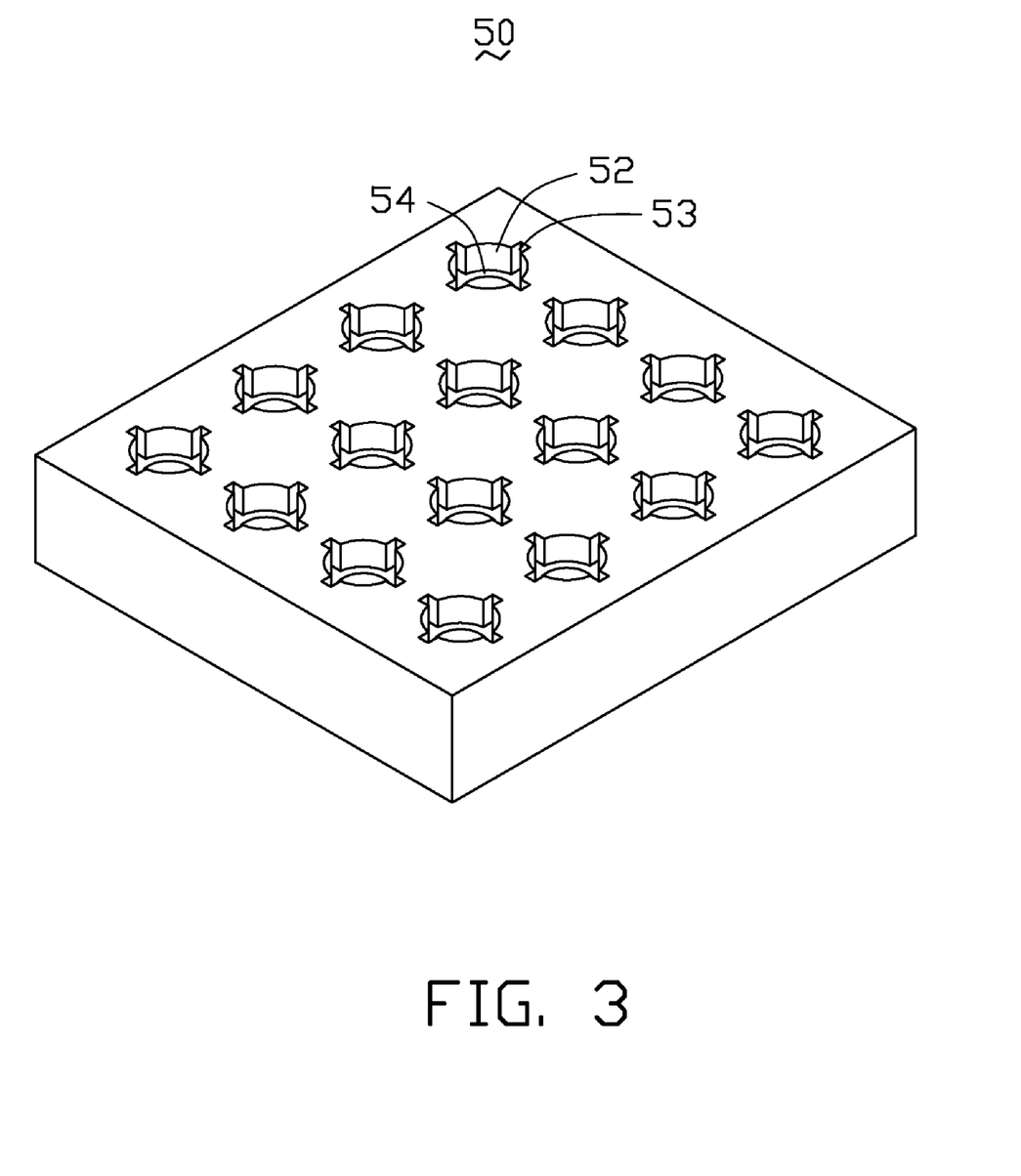
FIG. 3 is a schematic, isometric view of an apparatus for assembling a lens group in accordance with a second embodiment.
Figure 4:
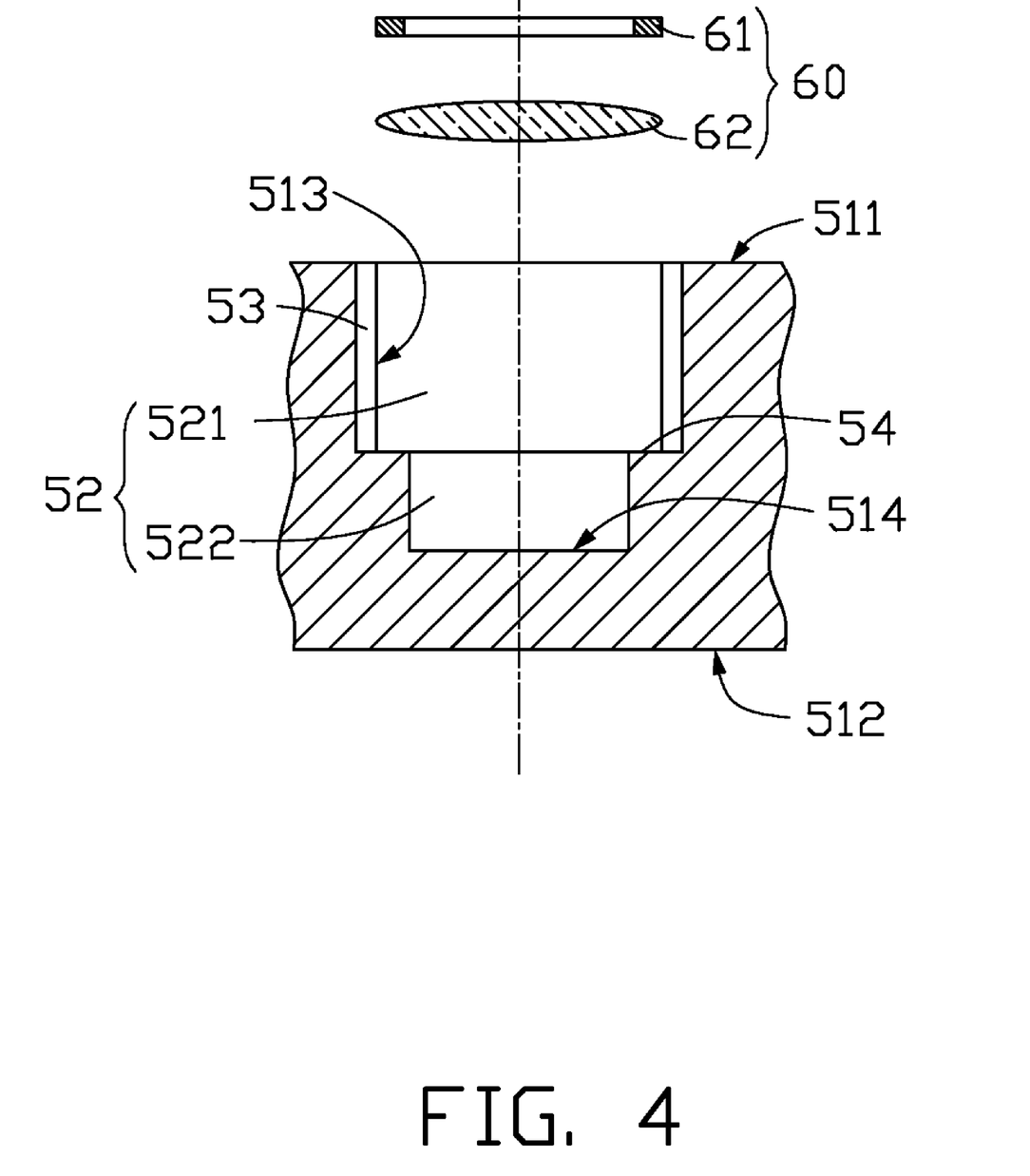
FIG. 4 is a cross-sectional view of a portion of an apparatus of FIG. 3, together with a lens group.

Referring to FIGS. 3 and 4, an apparatus 50 for assembling a lens group, according to a second embodiment, is similar to that of the apparatus 30 of the first embodiment, except that the apparatus 50 has an inner step 54 in the each of the cylindrical holes 52. The step 54 is formed on the inner bottom surface 514 in the corresponding cylindrical hole 52. Each cylindrical hole 52 includes a first section 521 adjacent to the first surface 511 and a second section 522 adjacent to the second surface 512. In other words, each cylindrical hole 52 is a stepped hole. The first section 521 is configured for accommodating the optical elements. The second section 522 is surrounded by the respective inner step 54, and is configured for preventing abrasion of a central optical portion of a lens contacting with the inner step 54.

In the present embodiment, each inner step 54 is annular. An extending direction of each inner step 54 from the inner side surface 513 is perpendicular to the inner side surface 513. The second section 522 has a diameter less than that of the first section 521. Four guiding grooves 53 are distributed at an equal angle interval along a central axis of each cylindrical hole 52. Each of the guiding grooves 53 runs from the first surface 511 to the inner step 54, and the length of each guiding groove 53 is equal to the depth of the first section 521.

Referring to FIG. 4, during a process for assembling a lens group 60, firstly, a lens 62 is placed into the first section 521 of each respective cylindrical hole 52 and attached to the inner steps 54. Meanwhile, a central axis of the lens 62 is coincidences with a central axis of each cylindrical hole 52. A central optical portion of the lens 62 is located in the second section 522. Secondly, a pacer 61 is assembled in the first section 521 and adhered to the respective lens 62. The following steps identical to that of the first embodiment are omitted.

Figure 5:
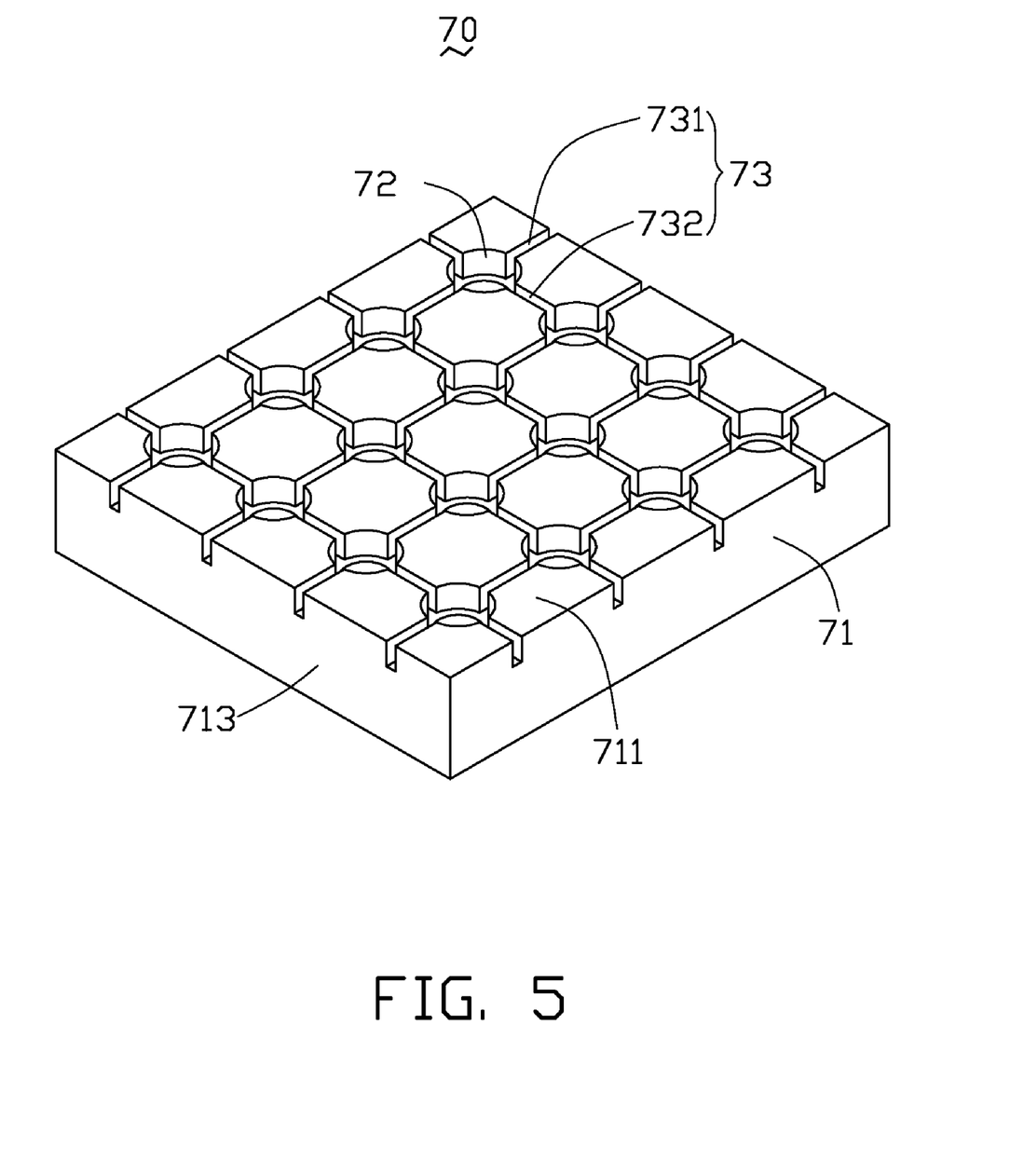
FIG. 5 is a schematic, isometric view of an apparatus for assembling a lens group in accordance with a third embodiment.

As shown in FIG. 5, an apparatus 70 for assembling a lens group according to a third embodiment, includes a lens tray 71, a number of cylindrical holes 72, and a number of guiding slots 73. The cylindrical holes 72 and the guiding slots 73 are defined in the lens tray 31.

In the third embodiment, the lens tray 71 has a first surface 711, two opposite lateral surfaces 713 perpendicular to the first surface 711. Each cylindrical hole 72 may be a stepped hole. The guiding slots 73 are defined in the first surface 711, and communicate with the cylindrical holes 72 aligned along an extending direction of the guiding slots 73. The guiding slots 73 extend along a direction parallel to the first surface 711, and are exposed at two opposite lateral surfaces 713 of the lens tray 71. The guiding slots 73 include a plurality of first guiding slots 731 and a plurality of second guiding slots 732. The extending direction of each first guiding slot 731 is intersectional and perpendicular to that of each second guiding slot 732. It is understood that the number and arrangement of guiding slots 73 are unlimited in this embodiment.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. An apparatus for assembling a lens group, comprising:
a lens tray having a first surface;
a plurality of cylindrical holes defined in the first surface for receiving a plurality of optical elements therein, the lens tray having an inner side surface in each hole; and
a plurality of guiding grooves defined in each inner side surface and exposed at the first surface, each groove communicating with the corresponding hole for allowing air to flow therethrough, the depth of each cylindrical hole being equal to the length of the corresponding guiding grooves.

2. The apparatus as claimed in claim 1, wherein the lens tray has an inner bottom surface in each of the cylindrical holes, the inner bottom surface perpendicularly adjoining the respective inner side surface.

3. The apparatus as claimed in claim 2, further comprising an inner step in each of the cylindrical holes.

4. The apparatus as claimed in claim 3, wherein each inner step is formed on the inner bottom surface in the corresponding cylindrical hole.

5. The apparatus as claimed in claim 4, wherein each cylindrical hole includes a first section adjacent to the first surface and a second section adjacent to the inner bottom surface, and the second section is surrounded by the corresponding inner step and has a diameter less than that of the first section.

6. The apparatus as claimed in claim 3, wherein each of the guiding grooves runs from the first surface to the inner step.

7. The apparatus as claimed in claim 5, wherein the length of each guiding groove is equal to the depth of the first section of the corresponding cylindrical hole.

8. The apparatus as claimed in claim 1, wherein each of the cylindrical holes is surrounded by a plurality of the guiding grooves.

9. The apparatus as claimed in claim 1, wherein each of the cylindrical holes is a stepped hole.

10. An apparatus for assembling a lens group, comprising:
a lens tray having a first surface and two opposite lateral surfaces at opposite sides of the first surface;
a plurality of cylindrical holes defined in the first surface for receiving a plurality of optical elements therein; and
a plurality of guiding slots defined in first surface, each slot communicating with the corresponding cylindrical hole for allowing air to flow therethrough, the guiding slots being exposed at the opposite lateral surfaces.

11. The apparatus as claimed in claim 10, wherein the guiding slots comprise a plurality of first guiding slots and a plurality of second guiding slots intersecting the first guiding slots.

12. The apparatus as claimed in claim 11, wherein the first guiding slots are perpendicular to the second guiding slots.

13. The apparatus as claimed in claim 10, wherein each of the cylindrical holes is a stepped hole.

14. An apparatus for assembling a lens group, comprising:
a lens tray having a first surface;
a plurality of cylindrical holes defined in the first surface for receiving a plurality of optical elements therein, the lens tray having an inner side surface in each hole;
a plurality of guiding grooves defined in each inner side surface and exposed at the first surface, each groove communicating with the corresponding hole for allowing air to flow therethrough;

an inner bottom surface in each of each of the cylindrical holes, the inner bottom surface perpendicularly adjoining the respective inner side surface; and an inner step in each of the cylindrical holes, each inner step formed on the inner bottom surface in the corresponding cylindrical hole;

wherein each cylindrical hole includes a first section adjacent to the first surface and a second section adjacent to the inner bottom surface, and the second section is surrounded by the corresponding inner step and has a diameter less than that of the first section, the length of each guiding groove is equal to the depth of the first section of the corresponding cylindrical hole.

* * * * *